United States Patent [19]
Noma et al.

[11] Patent Number: 5,670,839
[45] Date of Patent: Sep. 23, 1997

[54] THIN-FILM LUMINESCENCE DEVICE UTILIZING $ZN_{(1-x)}MG_xS$ HOST MATERIAL COMPOUND ACTIVATED BY GADOLINIUM OR A GADOLINIUM COMPOUND

[75] Inventors: Mikihiro Noma, Tenri; Akiyoshi Mikami, Ayama-gun, both of Japan

[73] Assignee: Sharp Kabushiki Kaisha, Osaka, Japan

[21] Appl. No.: 463,730

[22] Filed: Jun. 5, 1995

[30]     Foreign Application Priority Data

Jun. 14, 1994  [JP]  Japan ................... 6-132261

[51] Int. Cl.⁶ ............................ H01J 1/62; H05B 33/14
[52] U.S. Cl. .................... 313/503; 313/507; 428/917; 428/690
[58] Field of Search .................... 313/503, 506, 313/509, 512, 507; 315/169.3; 428/917, 690; 252/301.6 R, 301.6 S, 301.4 S, 301.4 H

[56]              References Cited

U.S. PATENT DOCUMENTS

| | | | |
|---|---|---|---|
| 4,869,973 | 9/1989 | Nishikawa et al. | 313/503 X |
| 4,975,338 | 12/1990 | Kageyama et al. | 313/503 X |
| 5,086,252 | 2/1992 | Kido | 313/503 |
| 5,270,614 | 12/1993 | Kitagawa et al. | 313/503 |
| 5,314,759 | 5/1994 | Harkonen et al. | 313/503 X |
| 5,444,268 | 8/1995 | Miyakoshi et al. | 313/503 X |

FOREIGN PATENT DOCUMENTS 63-18319  4/1988  Japan .
3-207786  9/1991  Japan .

OTHER PUBLICATIONS

Physical Properties, Spectrum of Rare–Earth Elements, pp. 387–397, Yukito Takanabe May 1963.

Applied Physice, vol. 40, No. 6, Light–emission of Lanthanide Element Ions in the Solid Matter, pp. 669–678, Eiichiro Nakazawa Mar. 1971.

"Photopumped Blue Lasers . . . ZnMgSSe" by Yuko Morinaga et al.; *Jpn. J. Appl. Phys.* vol. 32 (1993) pp. 678–680.

"Electroluminescence of . . . Ions" by Noboru Miura et al.; *Jpn. J. Appl. Phys.* vol. 31 (1992) pp. 51–59.

*Primary Examiner*—Ashok Patel
*Attorney, Agent, or Firm*—Birch, Stewart, Kolasch & Birch, LLP

[57]              ABSTRACT

The object of the invention is to provide UV light of increased luminous intensity. Layered on one surface of a translucent substrate are a transparent electrode, a first insulating layer, an EL layer, a second insulating layer, and a metal electrode, in that order. A compound of the general formula: $Zn_{(1-x)}Mg_xS$ is selected as a host material of the EL layer, and Gd or a Gd compound is selected as the luminescence center. The composition ratio x of the compound selected as a host material is selected to be within the range of $0.33 \leq x < 1$, and preferably within the range of from 0.4–0.8, inclusive. This selection allows the band gap energy of the host material to be higher than the band gap energy of the luminescence center, thus preventing the absorption of the emitted light by the host material and providing UV light of increased luminous intensity.

10 Claims, 3 Drawing Sheets

THIN-FILM LUMINESCENCE DEVICE UTILIZING $ZN_{(1-x)}MG_xS$ HOST MATERIAL COMPOUND ACTIVATED BY GADOLINIUM OR A GADOLINIUM COMPOUND

BACKGROUND OF THE INVENTION

1. Field of the Invention

The present invention relates to a thin-film EL (electroluminescent) device and a luminescence device utilizing it which emits light in the UV range (frequency: 200–400 nm).

2. Description of the Related Art

Thin-film EL devices which are self-generated-light emission type devices based on the electroluminescence phenomenon, are being investigated for practical utilization as, for example, display devices for color display since flat, thin devices may be made therefrom. Although color display requires emission of high-purity, high-intensity light of red, blue and green, the existing thin-film EL devices cannot emit satisfactory blue. Therefore, combinations of UV light-emitting thin-film EL devices and PL (photoluminescent) devices are under study for their possibility as means of emitting high-purity, high-intensity blue light.

An illustrative example of the combinations of UV light-emitting thin-film EL devices and PL devices is disclosed in Japanese Examined Patent Application SHO 63-18319 filed by the same applicants as those of the present application. According to the the aforementioned disclosure, there may be provided surface light-emitting devices which allow optional switching between a wide variety of colors of luminescence by superimposed arrangement of an EL layer and a PL layer wherein the EL layer is the source of excitation light which emits light in the UV range in response to the application of an electric field, and the PL layer is the source of light emission which emits PL light by irradiation with the excitation light from the EL layer. Materials for the EL layer include ZnS:Gd, $ZnS:GdF_3$, etc., while materials for the PL layer include $Y_2O_3:Eu$, $YVO_4:Eu$, $CaWO_4:Pd$, $Sr_2P_2O_7:Eu$, $Zn_2SiO_4:Mn$, $LaPO_4:Ce$, $LaPO_4:Tb$, etc.

Publicly known materials for EL layers which emit UV light include $ZnF_2:Gd$ as well as the aforementioned ZnS:Gd and $ZnS:GdF_3$, and such materials are described in, for example, Jpn. J. Appl. Phys. vol. 31, 1992: pp. 51–59.

The aforementioned UV light-emitting combinations of EL layers and PL layers, however, have a drawback in that sufficient EL intensity is not attained to establish satisfactory intensities of PL light. Thin-film EL devices with the aforementioned ZnS:Gd or $ZnS:GdF_3$ fail to emit sufficient EL light for practical use, for which reason surface light-emitting devices utilizing them have no practical applications.

In addition, thin-film EL devices with the aforementioned $ZnF_2:Gd$ are also not yet in actual use since their luminous life is relatively short, and further their luminous intensity is not stable.

SUMMARY OF THE INVENTION

It is an object of the present invention to provide a thin-film EL device and a luminescence device utilizing it which emits UV light of increased luminous intensity. The invention resides in a thin-film EL device which comprises at least an EL layer disposed between a pair of electrodes, wherein the EL layer is constructed from a host material and luminescence centers incorporated into the host material, characterized in that the host material to be selected is a compound represented by the general formula: $Zn_{(1-x)}Mg_xS$ (0<x<1); and the luminescence center is selected from Gd or a Gd compound.

The invention is further characterized in that the composition ratio x is in the range of $0.33 \leq x < 1$.

The invention is further characterized in that the composition ratio x is in the range of from 0.4–0.8, inclusive.

The invention is further characterized in that the composition ratio x is about 0.6 and the luminescence center is $GdF_3$.

Also, the invention resides in a luminescence device which comprises a pair of electrodes, an EL layer disposed between the pair of electrodes which emits electroluminescence in response to the application of an electric field, and a PL layer disposed opposite the EL layer relative to either of the pair of electrodes which emits photoluminescence in response to the electroluminescences by the EL layer, wherein the EL layer, comprises a host material and luminescence centers incorporated thereto, characterized in that the host material is selected from a compound represented by the general formula: $Zn_{(1-x)}Mg_xS$ (0<x<1), and that the luminescence center is selected from Gd or a Gd compound.

According to the invention, it is possible to both emit UV light as the electroluminescence and select the composition of the host material as desired without resulting in changing the luminous wavelength band, by using a compound represented by the general formula: $Zn_{(1-x)}Mg_xS$ (0<x<1) as the host material which constitutes the EL layer of a thin-film EL device at least with an EL layer disposed between a pair of electrodes and by using Gd or a Gd compound as the luminous center.

Preferably, the composition ratio x of the compound to be selected as the host material is selected to be in the range of $0.33 \leq x < 1$. This selection provides a band gap energy of the host material which is higher than the band gap energy (equivalent to 4.0 eV) of the Gd atom of the luminescence center. Although the host material is usually a semiconductor which has the property of absorbing higher energy light than its band gap energy, the selection of the composition ratio to satisfy the aforementioned requirement serves to prevent absorption of the emitted light by the host material, and thus to emit UV light of increased luminous intensity.

More preferably, the composition ratio x is selected to be in the range of from 0.4–0.8, inclusive. It has been confirmed that the selection of the composition ratio x within the above range allows emission of UV light of more increased luminous intensity.

Still more preferably, the composition ratio x is selected to be about 0.6 and $Zn_{0.4}Mg_{0.6}S$ is used as the host material. $GdF_3$ as the luminescence center. This has been confirmed to give emission of UV light of high luminous intensity.

According to the invention, thin-film EL device which emits UV light of such increased luminous intensity may be used as the luminescence device in combination with a PL device, for example, in which case the thin-film EL device which emits electroluminescence by the application of voltage is the source of excitation light, and the PL device which emits photoluminescence by the light from the thin-film EL device is the source of luminescence. Since this type of luminescence device emits UV light or increased luminous intensity from the thin-film EL device of the invention, which is the excitation light source, and thus gives photo-luminescence with a satisfactory luminous intensity, it may be advantageously used for construction of luminous displays for display units or light sources.

As mentioned above, a compound of the general formula: $Zn_{(1-x)}Mg_xS$ (0<x<1) is selected as the host material for the EL layer, and Gd or a Gd compound is selected as the luminescence center according to the invention. In addition, the composition ratio x of the host material is preferably selected to be in the range of 0.33x<1, and more preferably in the range of from 0.4–0.8, inclusive and still more preferably x being about 0.6. As a result, since the band gap energy of the host material becomes higher than the band gap energy of the luminescence center, the emitted light is not absorbed by the host material, and UV light of increased luminous intensity is emitted.

DETAILED EXPLANATION OF THE PREFERRED EMBODIMENTS

Figure 1:
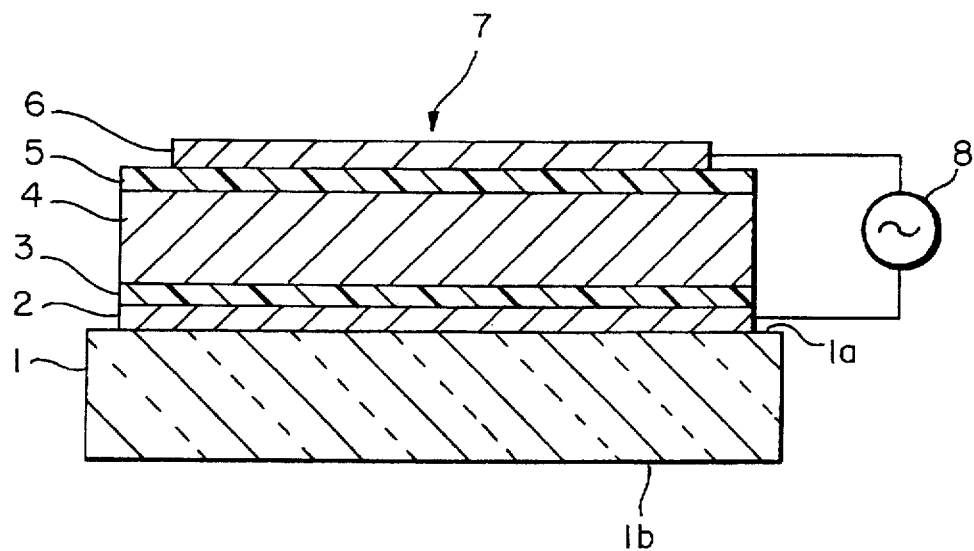
FIG. 1 is a cross sectional view which shows the configuration of an embodiment of the thin-film EL device 7 according to the invention.

FIG. 1 is a cross sectional view which shows the configuration of an embodiment of the thin-film EL device 7 according to the invention. The thin-film EL device 7 comprises a translucent substrate 1, a transparent electrode 2, a first insulating layer 3, an EL layer 4, a second insulating layer 5 and a metal electrode 6. For example, the transparent electrode 2 is formed on one surface 1a of the translucent substrate 1 made of glass. The transparent electrode 2 is made of, e.g., an ITO (indium tin oxide) film with a film thickness of 200 nm. The first insulating layer 3 is formed on a surface of the transparent electrode 2. The first insulating layer 3 is formed with a film thickness of, for example, 200 nm, and comprises a $SiO_2$ film formed on the transparent electrode 2 and a $Si_3N_4$ film formed on the $SiO_2$.

The EL layer 4 is formed on a surface of the first insulating layer 3. The EL layer 4 is constructed from an EL layer material which comprises a compound represented by the general formula: $Zn_{(1-x)}Mg_xS$ (0<x<1) as the host material and a luminescence center comprising at least $GdF_3$ which is incorporated in the host material. The EL layer 4 is formed with a film thickness of, for instance, 800 nm. The second insulating layer 5 is formed on a surface of the EL layer 4. The second insulating layer 5 is formed with a film thickness of, for example, 200 nm, and comprises a $Si_3N_4$ film formed on the EL layer 4 and a $SiO_2$ film formed on the aforementioned $Si_3N_4$. The metal electrode 6 is formed on a surface of the second insulating layer 5. The metal electrode 6 is made of, for example, an aluminum film with a film thickness of 150 nm.

Here, he transparent electrode 2 may be formed from Al-doped ZnO in the same manner as from the aforementioned ITO, and the first and second insulating layers 3 and 5 may be made from $Ta_2O_5$ or $Al_2O_3$ as well as the aforementioned materials. Thin films which are formed into the transparent electrode 2, first insulating layer 3, EL layer 4 and second insulating layer 5 may be formed by a variety of methods of forming thin films, including sputtering, electron beam evaporation, etc. In addition, thin films of Al to be formed into the metal electrode 6 may be formed by resistance heating evaporation, for example. On the other hand, the luminescence center of the EL layer 4 may be a chloride of Gd ($GdCl_x$) such as $GdCl_3$ as well as the aforementioned fluorides of Gd ($GdF_x$) such as $GdF_3$, or a simple substance Gd or F may be added to the host material, individually. Also, since a rare earth element, its chloride, fluoride, nitride or a phosphide thereof is commonly used as a luminescence center, GdN and GdP may be employed in the invention.

The electrodes 2, 6 in thin-film EL devices 7 which are formed in this manner are connected to an AC power supply 8, and an electroluminescence phenomenon occurs in the EL layer 4 when an AC voltage (e.g., on the order of 200 volts) exceeding the threshold voltage of luminescence of the EL layer 4 is applied. The light generated by this phenomenon leaves the aforementioned translucent substrate 1 through its other surface 1b opposite the aforementioned one surface 1a. More specifically, the light generated in the EL layer 4 is transmitted through and leaves the first insulating layer 3, transparent electrode 2 and translucent substrate 1, in that order. On the other hand, the light which has emerged from the side of the EL layer 4 facing the second insulating layer 5 travels through the second insulating layer 5, and is reflected by the metal electrode 6 and then transmitted through the second insulating layer 5, EL layer 4, first insulating layer 3, transparent electrode 2 and translucent substrate 1, in that order. No electroluminescence phenomenon occurs in the EL layer 4 at applied voltages lower than the threshold voltage. Accordingly, control of the voltage to be applied allows switching between luminescent and non-luminescent states.

The aforementioned EL layer 4 may be formed as follows, for example. ZnS and MgS are mixed at a ratio of (1−x):x (mole ratio). To the resulting mixture there is added 1 mole % $GdF_3$, and the mixture is molded under pressure, after which the molding is processed by sintering at 900° C. for 1 hour in an atmosphere of Ar gas to prepare a pellet. By this sintering most ZnS and MgS substances undergo a chemical reaction to form a compound $Zn_{(1-x)}Mg_xS$. The pellet prepared in this manner is used to form the EL layer 4 by electron beam evaporation. An explanation will now be given regarding the results of investigation of the composition ratio x of the host material $Zn_{(1-x)}Mg_xS$ of the EL layer 4.

Figure 2:
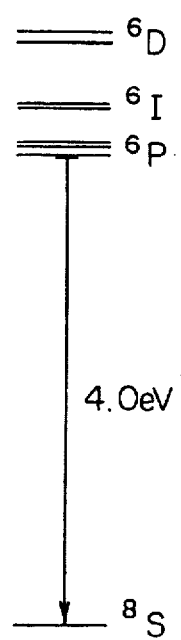
FIG. 2 is a diagram view which shows the energy level of the Gd atom.

FIG. 2 is a view which shows the energy level of the Gd atom which functions as the luminescence center. Luminescence of the Gd atom is caused by transition of electrons in the inner shell which orbit the nucleus of the Gd atom. The state of the atom is described by a set of four quantum numbers: n, l, m and s. Here, n, l, m and s represent principal quantum number, orbital angular-momentum quantum number, magnetic quantum number, and spin angular-momentum quantum number, respectively. In addition, the state of the entire atom is described by the expression $^{2S+1}L_J$, using the total orbital angular momentum L, total spin angular momentum S and total angular momentum J. Here, the total orbital angular momentum L is represented as S, P, D, F, G, H ... when L equals to 1, 2, 3, 4, 5, ..., respectively. This means that the energy increases as the total orbital angular momentum L increases.

In cases where the Gd atom emits light, the entire state of the atom undergoes transition from the $^6P_{7/2}$ state to the $^8S$ state, with a band gap energy of 4.0 eV. Here, the emitted light is UV light with a wavelength of 310 nm. Such information is described in Physical Properties, July issue, 1963, pp. 387–397; and Applied Physics, vol. 40, Nov. 6, 1971, pp. 669–678.

Since the luminescence from the Gd atom is caused by transition of electrons in its inner shell, the luminous wavelength band changes little regardless of the types of atoms present near the Gd atom in the host material. Accordingly, the composition of the host material may be selected as desired without resulting in changes in the luminous wavelength band.

The host material is usually a semiconductor which has the property of absorbing light with a higher-energy frequency than its band gap energy. Accordingly, in order to cause efficient luminescence of the Gd atom, preferably selection is made of a host material with a higher band gap energy than the band gap energy (4.0 eV) of the Gd atom.

Of the host materials ZnS and MgS for the EL layer 4 of the invention, MgS has the same crystal system as sphalerite ZnS, and its band gap energy is 4.6 eV. In addition, MgS may form mixed crystals with ZnS. For this reason, change in the ratio of Zn and Mg in the host material may lead to control of the band gap energy of the host material. Such teachings are described in Jpn. J. Appl. Phys., vol. 32, 1993, pp. 678–680. This means that the band gap energy of the host material may be set to be higher than the band gap energy of the Gd atom by changing the composition ratio of the $Zn_{(1-x)}Mg_xS$ in the EL layer.

Figure 3:
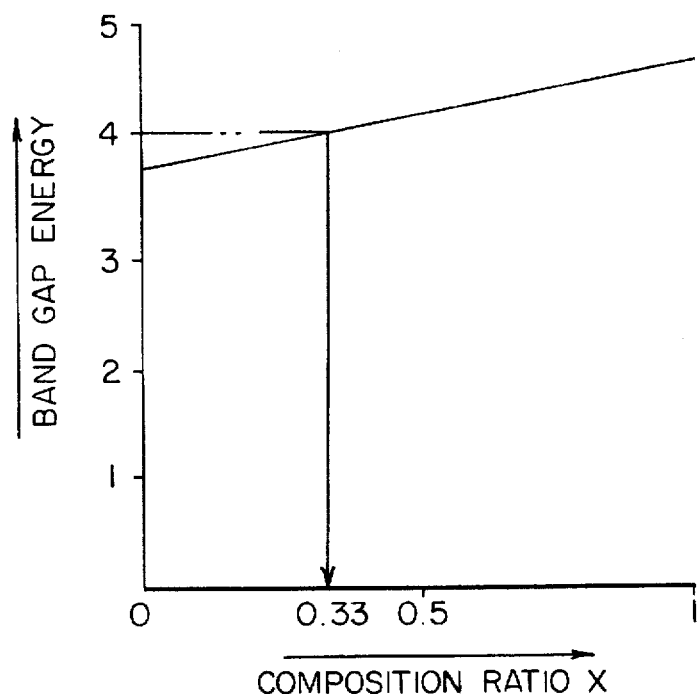
FIG. 3 is a graph which illustrates the relationship between the composition ratio x of $Zn_{(1-x)}Mg_xS$ and the band gap energy.

FIG. 3 is a graph which illustrates the relationship between the composition ratio x of $Zn_{(1-x)}Mg_xS$ and the band gap energy. The x-axis represents the composition ratio x, while the y-axis represents the band gap energy. The composition ratio x=0 is for ZnS, whereas the composition ratio x=1 is for MgS. The band gap energy for x=0, that is, ZnS, is 3.7 eV, and the band gap energy for x=1 which corresponds to MgS is 4.6 eV. Since the band gap energy varies roughly linearly with the ratio of Zn and Mg, the band gap energy Eg of the host material $Zn_{(1-x)}Mg_xS$ may be calculated according to the equation: Eg=0.9x+3.7. Based on this equation, the composition ratio x for Eg=4.0 eV is determined to be 0.33, resulting in establishment of the preferred range of $0.33 \leq x<1$ for the composition ratio x of $Zn_{(1-x)}Mg_xS$.

Figure 4:
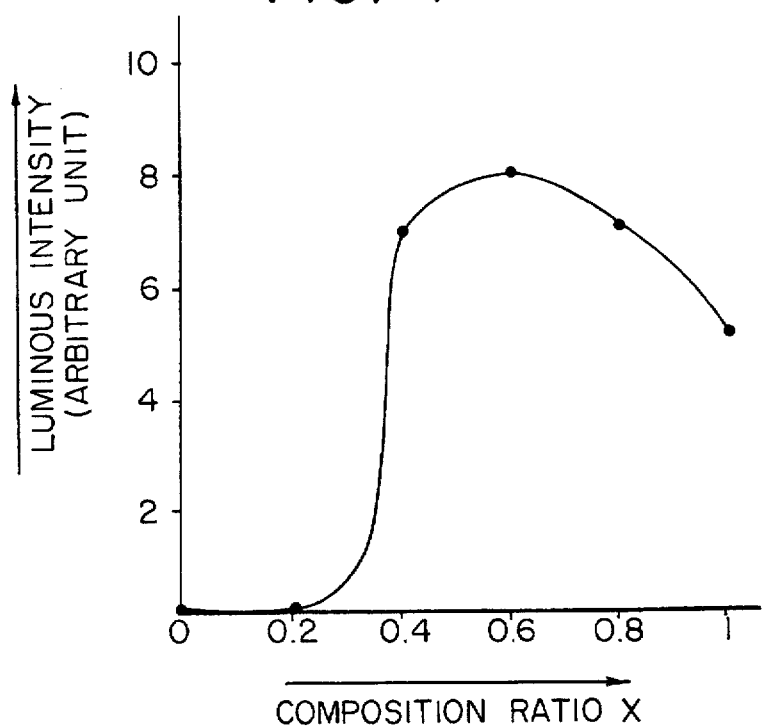
FIG. 4 is a graph which illustrates the composition ratio x and the luminous intensity of the thin-film EL device 7.

FIG. 4 is a graph which illustrates the relationship between the composition ratio x of $Zn_{(1-x)}Mg_xS$ and the luminous intensity of the thin-film EL device 7 constructed therefrom. The results shown in the graph prove that the range of from 0.4–0.8, inclusive for the composition ratio x provides particularly excellent luminous intensities.

Figure 5:
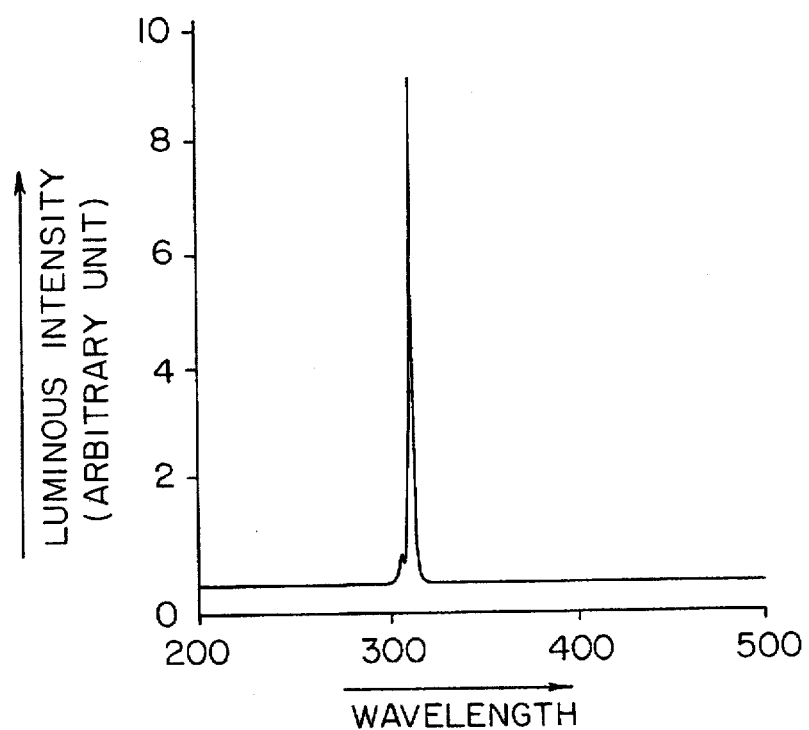
FIG. 5 is a graph which illustrates an emission spectrum in cases where the compound $Zn_{0.4}Mg_{0.6}S$ is used as the host material.

FIG. 5 is a graph which illustrates an emission spectrum of a thin-film EL device 7 constructed with the compound $Zn_{0.4}Mg_{0.6}S$ (x=0.6) as the host material, that is $Zn_2ME_3S_5$. The graph confirms that the luminescence has the highest peak at 310 nm in the UV range.

Figure 6:
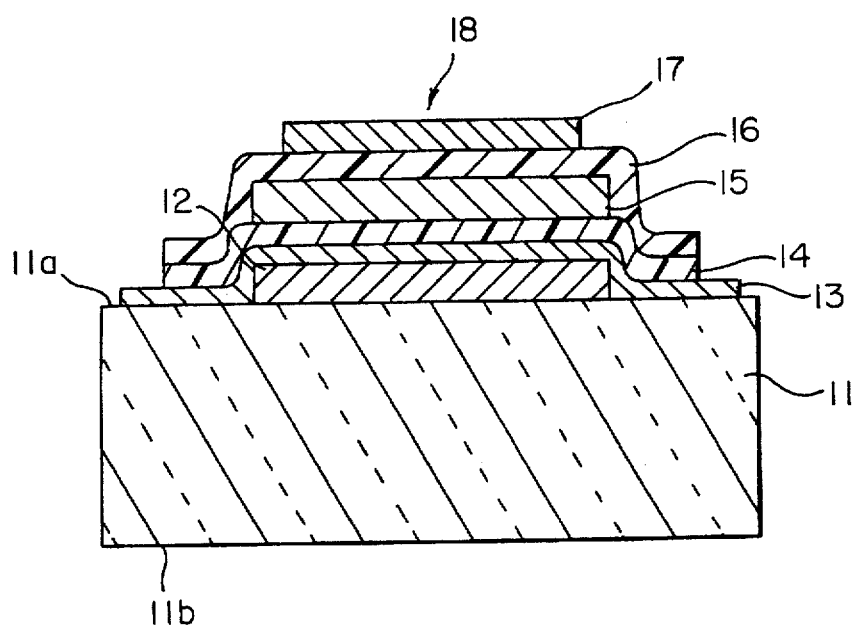
FIG. 6 is a cross sectional view illustrating the configuration of the surface light-emitting device 18 which is prepared by combination of a thin-film EL device according to the invention and a PL device.

FIG. 6 is a cross sectional view illustrating the configuration of the surface light-emitting device 18 which is prepared by combination of a thin-film EL device according to the invention and a PL device. The surface light-emitting device 18 is formed with a translucent substrate 11, a PL layer 12, a transparent electrode 13, a first insulating layer 14, an EL layer 15, a second insulating layer 16 and a metal electrode 17. The PL layer 12 is formed on one surface 11a of the translucent substrate 11 which is made of glass, for example. The PL layer 12 is formed from a material having the property of emitting fluorescence in the visible range upon application of UV light, by an already known method for formation of thin films. The materials available for use include a variety of fluorescent materials which have the aforementioned property; for example, red-emitting materials include Eu-doped $Y_2O_3$ and Eu-doped $YVO_4$, blue-emitting materials include Pd-doped $CaWO_4$ and Eu-doped $Sr_2P_2O_7$, and green-emitting materials include Mn-doped $Zn_2SiO_4$ and Ce or Tb-doped $LAPO_4$.

The transparent electrode 13 is formed on one surface 11a of the translucent substrate 11 on which is formed the PL layer 12, overlying the PL layer 12, with the first insulating layer 14, EL layer 15, second insulating layer 16 and metal-electrode 17 formed on the transparent electrode 13, in that order. The transparent electrode 13, first insulating layer 14, EL layer 15, second insulating layer 16 and metal electrode 17 are formed in the same manner as the transparent electrode 2, first insulating layer 3, EL layer 4, second insulating layer 5 and metal electrode 6 of the thin-film EL device 7 mentioned above.

The surface light-emitting device 18 formed in this manner, which comprises the EL layer 15 as the excitation light source and the PL layer 12 as the luminescence source, is designed so that the PL layer 12 emits light in response to the excitation light from the EL layer 15. The EL layer 15, which is formed according to the present embodiment, emits UV light of increased luminous intensity. As a result, the photoluminescence has a relatively high luminous intensity.

The device disclosed in Japanese Unexamined Patent Application HEI 3-207786, which comprises $Zn_{(1-x)}Mg_xS$ (x ranging from 0 to 0.2) as the host material of the EL layer and $Pr^{3+}$ as the luminescence center, is aimed to acquire white luminescence in the visible light range, which is totally different from UV light of increased luminous intensity which is obtained according to the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A thin film EL device comprising at least an EL layer disposed between a pair of electrodes, the EL layer including a host material and luminescence centers incorporated thereinto, wherein the host material is selected from a compound represented by the general formula: $Zn_{(1-x)}Mg_xS$, wherein the composition ratio; x, of Mg is in the range of 0.33–0.8, inclusive;

and the luminescence center is selected from Gd or a Gd compound.

2. The thin-film EL device according to claim 1, wherein the composition ratio x is within the range of from 0.4–0.8, inclusive.

3. The thin-film EL device according to claim 1, wherein the composition ratio x of the selected compound as the host material in about 0.6 and the luminescence center is selected to be $GdF_3$.

4. The thin film EL device according to claim 1, wherein said Gd compound is selected from the group consisting of a Gd-chloride, a Gd-fluoride, a Gd-nitride and a Gd-phosphide.

5. A luminescence device comprising:

a pair of electrodes;

an EL layer, disposed between the pair of electrodes, for emitting the pair electroluminescence in response to the application of an electric field, the EL layer including a host material and luminescence centers incorporated thereinto; and a Pn layer for emitting photoluminescence in response to the electroluminescence by the EL layer, the PL layer disposed opposite the EL layer relative to either of the pair of electrodes, wherein the host material is selected from a compound represented by the general formula: $Zn_{(1-x)}Mg_xS$, wherein the composition ratio, x, of Mg is in the range of 0.33–0.8, inclusive;

and the luminescence center is selected from Gd or a Gd compound.

6. The luminescence device according to claim 5, wherein said PL layer comprises a red-emitting material, a blue-emitting material or a green-emitting material.

7. The luminescence device according to claim 6, wherein said red-emitting material is selected from the group consisting of Eu-doped $Y_2O_3$ and Eu-doped $YVO_4$.

8. The luminescence device according to claim 6, wherein said blue-emitting material is selected from the group consisting of Pd-doped $CaWO_4$ and Eu-doped $Sr_2P_2O_7$.

9. The luminescence device according to claim 6, wherein said green emitting material is selected from the group consisting of Mn-doped $Zn_2SiO_4$, Ce-doped $LaPO_4$ and Tb-doped $LAPO_4$.

10. The luminescence device according to claim 5, wherein said Gd compound is selected from the group consisting of a Gd-chloride, a Gd-fluoride, a Gd-nitride and a Gd-phosphide.

* * * * *